(12) United States Patent
Laugwitz

(10) Patent No.: US 10,060,086 B2
(45) Date of Patent: Aug. 28, 2018

(54) TAMPING BEAM DEVICE OF A PAVING SCREED, PAVING SCREED, ROAD PAVER, AND METHOD FOR CHANGING THE STROKE OF A TAMPING BEAM DEVICE

(71) Applicant: BOMAG GmbH, Boppard (DE)

(72) Inventor: Niels Laugwitz, Lahnstein (DE)

(73) Assignee: BOMAG GmbH, Boppard (DE)

( * ) Notice: Subject to any disclaimer, the term of this patent is extended or adjusted under 35 U.S.C. 154(b) by 2 days.

(21) Appl. No.: 15/384,608

(22) Filed: Dec. 20, 2016

(65) Prior Publication Data

US 2017/0183831 A1 Jun. 29, 2017

(30) Foreign Application Priority Data

Dec. 23, 2015 (DE) .................... 10 2015 016 777

(51) Int. Cl.
*E01C 19/48* (2006.01)
*E01C 19/38* (2006.01)
*B06B 1/04* (2006.01)
*E01C 19/40* (2006.01)
*H02K 7/06* (2006.01)
*B06B 1/10* (2006.01)

(52) U.S. Cl.
CPC ............. *E01C 19/38* (2013.01); *B06B 1/04* (2013.01); *B06B 1/10* (2013.01); *E01C 19/40* (2013.01); *E01C 19/4853* (2013.01); *H02K 7/06* (2013.01)

(58) Field of Classification Search
CPC .......... E01C 19/38; E01C 19/40; E01C 19/48; E01C 19/4853; H02K 7/06; B06B 1/04; B06B 1/10

USPC .............. 404/84.05, 113, 118, 133.05–133.2
See application file for complete search history.

(56) References Cited

U.S. PATENT DOCUMENTS

| 4,439,057 A * | 3/1984 | Sprague ................. E02D 3/046 173/205 |
| 4,502,813 A | 3/1985 | Hojberg |
| 6,019,544 A * | 2/2000 | Emerson ............... E01C 19/405 404/104 |
| 8,998,530 B2 * | 4/2015 | Buschmann .......... E01C 19/407 404/118 |
| 9,790,648 B2 * | 10/2017 | Buschmann .......... E01C 19/004 |

(Continued)

FOREIGN PATENT DOCUMENTS

| DE | 3149335 A1 | 7/1982 | |
| DE | 102011119938 | * 12/2011 | ............. E01C 19/48 |

(Continued)

*Primary Examiner* — Raymond W Addie
(74) *Attorney, Agent, or Firm* — Wood Herron & Evans LLP

(57) ABSTRACT

A tamping beam device of a paving screed, in particular of a road paver, is provided with a tamping beam arranged on a connecting rod, with a drive shaft connected to the connecting rod via an eccentric device, the eccentric device being configured such that a first and a second stroke adjustment position of the connecting rod can be adjusted depending on the direction of rotation of the drive shaft. Stroke adjustment is effected via an eccentric device with a thrust member comprising an inclined sliding surface and with an eccentric ring and a slide guidance. A method for changing the stroke of a tamping beam includes changing the direction of rotation of the eccentric device.

20 Claims, 7 Drawing Sheets

(56) References Cited

U.S. PATENT DOCUMENTS

| | | | |
|---|---|---|---|
| 2002/0168226 A1* | 11/2002 | Feucht | E01C 19/407 404/84.1 |
| 2006/0034658 A1* | 2/2006 | Heims | E01C 19/40 404/114 |
| 2011/0213270 A1* | 9/2011 | Pison | A61B 10/02 600/562 |
| 2015/0139730 A1 | 5/2015 | Buschmann et al. | |
| 2015/0225909 A1* | 8/2015 | Bertz | E01C 19/38 404/102 |

FOREIGN PATENT DOCUMENTS

| | | |
|---|---|---|
| EP | 2325392 A2 | 5/2011 |
| EP | 2325391 B1 | 3/2013 |
| EP | 1905899 B1 | 4/2014 |
| EP | 2599919 B1 | 12/2014 |
| EP | 2905378 B1 | 9/2016 |

* cited by examiner

US 10,060,086 B2

TAMPING BEAM DEVICE OF A PAVING SCREED, PAVING SCREED, ROAD PAVER, AND METHOD FOR CHANGING THE STROKE OF A TAMPING BEAM DEVICE

CROSS-REFERENCE TO RELATED APPLICATIONS

The present application claims priority under 35 U.S.C. § 119 of German Patent Application No. 10 2015 016 777.4, filed Dec. 23, 2015, the disclosure of which is hereby incorporated herein by reference in its entirety.

FIELD OF THE INVENTION

The present invention relates to a tamping beam device of a paving screed, a paving screed, a road paver, and to a method for changing the stroke of a tamping beam device.

BACKGROUND OF THE INVENTION

Tamping beam devices of such type are known from the prior art. In this regard, reference is made to European Patent EP 1 905 899 B1, EP 2 325 391 B1 as well as to EP 2 905 378 A1. Such tamping beam devices serve for pre-compaction and/or post-compaction of the paving material, usually asphalt, during the paving process. The tamping beam devices usually comprise at least one tamping beam arranged on at least one connecting rod, and a drive shaft which is connected to the connecting rod via an eccentric device and via which the drive motion is transferred into the tamping beam device. Driving the drive shaft can be effected via a hydro motor or electric motor or a drive gear driven upstream. Translation of the rotational movement about the rotation axis of the drive shaft into a tamping movement of the tamping beam is effected by means of the eccentric device. As often described in the prior art, said device may comprise a so-called eccentric shaft, the essential feature of which is that it comprises a transmission area which is eccentric relative to the shaft. Typical strokes of the tamping beam in the vertical direction achieved via known eccentric devices often range from 1 mm to 10 mm.

It has been found during the paving process that different strokes may be advantageous depending on the paving thickness, for example. Some of the above described documents propose the option of designing the eccentric device in such a way that depending on the rotation direction of the drive shaft, a first and a second stroke adjustment of the tamping beam can be set. Thus, by switching the rotation direction of the drive shaft, at least two different strokes of the tamping beam can be realized in a simple manner. If hydro motors or electric motors are used for driving, said switching of the rotation direction of the drive shaft is achieved in a simple manner. However, in this case, switching is often times effected very abruptly, which sometimes constitutes a considerable material stress.

As an alternative, it is already known from the prior art to realize stroke adjustment within the tamping beam by means of manual adjustment options. This approach allows a particularly wide-ranging and relatively precise adjustment of the respective stroke of the tamping beam to the present installation conditions. However, such stroke adjustment is very time-consuming and thus disadvantageous.

SUMMARY OF THE INVENTION

Based upon the above-described prior art, it is thus object of the present invention to provide a tamping beam device that allows stroke adjustment by changing the rotation direction of the drive shaft in an improved manner.

One aspect of the present invention is that the desired stroke adjustment be achieved essentially by means of a linear displacement of a thrust member along the longitudinal axis of the drive shaft. In this regard, the eccentric device specifically comprises a thrust member adjustable by means of rotation of the drive shaft via a rotary thrust device in the axial direction, the thrust member comprising, on its outer circumferential surface, an inclined sliding surface that extends inclined relative to the rotation axis of the drive shaft. According to the present invention, the rotary thrust device is configured such that it translates rotational movement of the drive shaft into a displacement movement of the thrust member along the rotation axis of the drive shaft. Thus, the rotary thrust device preferably constitutes a rotary thrust gear which is configured in such a way that it translates the incoming rotational movement of the drive shaft into a linear displacement movement of the thrust member along the drive shaft. This may be effected in a fashion similar to a spindle drive, for example. According to the present invention, said linear displacement movement of the thrust member is used for adjusting the eccentricity of the eccentric device.

Preferably, the rotary thrust device is configured as a contact geometry having the shape of a helical line. This means that it comprises a threaded portion extending in the manner of a helical line which is engaged by a suitable counter element, such as a catching pin, or a counter-thread etc., for example. The rotational movement of the drive shaft causes said counter element to run along the threaded portion or to be threaded along the rotation axis of the drive shaft, respectively. According to the present invention, said translation of movement is used for adjusting the eccentricity in a manner described below in greater detail.

As regards the specific configuration of the rotary thrust device, a plurality of alternative embodiments may be used to achieve the desired functionality of movement. For example, it may comprise a thread running coaxially to the rotation axis of the drive shaft. For example, said thread may be arranged on the thrust member and/or on the drive shaft. If both the thrust member as well as the drive member comprise such a threaded portion, they are ideally configured in a complementary manner. What is important in each case is that a counter-element which is suitable for engaging the thread from a respective counter-side is actually provided. This may, for example, be a pin that engages the thread, in particular a catching pin. It is ideal here if the pin is configured in such a way that it engages the thread from two opposite sides, respectively. This may basically also be achieved by two individual pins, which are particularly preferably arranged coaxially to one another.

The thrust device is preferably configured such that it comprises a threaded portion running in the axial direction on the drive shaft. In particular, said thread is a screw thread, the helical line of which winds, at a constant slope, around the jacket of a cylinder which essentially corresponds to the preferably cylindrical drive shaft. The cylinder axis corresponds to the revolution or rotation axis of the drive shaft. As will be described below in greater detail, the displacement movement for stroke adjustment is basically driven via said thread.

Thus, the thrust member is an essential element of the eccentric device. The thrust member is coupled to the drive shaft via the rotary thrust device in such a way that it is displaceable along the drive shaft via the rotational movement within a predefined range. To that end, the thrust member at least partially engages a threaded portion on the drive shaft, for example. It is important for the thrust member to comprise an inclined sliding surface on its outer circumferential surface, which inclined sliding surface extends inclined relative to the rotation axis of the drive shaft. Thus, the thrust member is an element of the eccentric device which is guided by the rotary thrust device, for example, by the thread of a threaded portion on the drive shaft. To that end, for example, the thrust member may at least partially completely engage around the threaded portion, i.e., be configured to surround the drive shaft, or it may only partially engage the thread with respect to the circumference of the thread. A form-fit connection is provided between the drive shaft and the thrust member so that an axial displacement of the thrust member along the drive shaft is effected upon rotational movement of the drive shaft, which can be compared to a nut running on a spindle, for example. Thus, the thrust member can be displaced longitudinally along the rotation axis of the drive shaft at least to a limited extent. The thrust member can therefore also change its position along the rotation/revolution axis relative to the drive shaft at least within a limited range. According to one embodiment of the present invention, for translation of the longitudinal movement of the thrust member into a stroke adjustment of the tamping beam, the thrust member comprises an inclined sliding surface. Said sliding surface is to run in an inclined manner relative to the rotation axis of the drive shaft. The inclined sliding surface thus refers to a guiding surface along which the eccentric ring is guided, as will be described below in greater detail. The inclined sliding surface is ideally arranged on the outer circumferential surface or outer jacket surface of the thrust member. The inclined sliding surface may be designed as circumferentially entirely surrounding the thrust member, or it may only relate to a part of the outer circumferential surface. The inclination of the inclined sliding surface is determined in the longitudinal extension of the inclined sliding surface, specifically with reference to a virtual reference plane in which the rotation axis of the drive shaft is located. The inclined sliding surface may be linear, although the present invention also covers curved or more complex shapes or progressions of the inclined sliding surface. A linear progression of the inclined sliding surface is advantageous in that it can be manufactured in a relatively simple manner and, in addition, enables reliable operation.

Another element of the eccentric device of the tamping beam device according to one embodiment of the present invention is an eccentric ring supported on the connecting rod and which comprises a receiving space for the thrust member with a slide guidance running on the inclined sliding surface of the thrust member. An object of the eccentric ring is to provide eccentricity in cooperation with the drive shaft or the eccentric device, respectively, which eccentricity is then taken up by the connecting rod and finally translated into a tamping movement of the tamping bar. Here, the slide guidance abuts the inclined sliding surface of the thrust member. If the thrust member is displaced relative to the eccentric ring in the axial direction of the drive shaft, the slide guidance slides along the inclined sliding surface, finally effecting radial displacement and thus displacement of the eccentricity of the eccentric ring. This results in the change in the tamping stroke. It will be readily understood that the scope of the present invention also includes embodiments where the inclined sliding surface and/or the slide guidance have different sizes and/or extensions, in particular in the axial direction of the drive shaft. The essential factor is that the slide guidance can slide along the inclined sliding surface and finally effects translation of the movement in the axial direction of the drive shaft into radial displacement of the eccentric ring. The contact surface between the inclined sliding surface and the slide guidance may be configured comparatively small to reduce friction, for example. In order to allow for reliable guidance without jamming, it is preferred if the inclined sliding surface and the slide guidance have a joint support surface, which, when viewed in the axial direction of the drive shaft, at least corresponds to the displacement path of the thrust member, and which is, in particular, greater than the displacement path of the thrust member. The eccentric ring basically links the connecting rod to the eccentric device and thus indirectly to the drive shaft.

In order to allow a movement range of the thrust member relative to the eccentric ring at all, the eccentric ring is further configured such that it comprises a receiving space for the thrust member, inside of which the thrust member may be displaced relative to the eccentric ring along the rotation axis of the drive shaft in a manner to be described in more detail below. Specifically, the receiving space is configured such that the thrust member is displaceable along the threaded portion in the axial direction of the drive shaft between a first and a second stop position by rotation of the drive shaft in the one or the other direction of rotation. If, starting from a stop position, the direction of rotation of the drive shaft is changed, the thrust member, driven by the rotary thrust device, in particular by a threaded portion on the drive shaft, slides in the direction of the respectively other stop position until it reaches said position. If it is hindered in continuing said displacement movement by the stop, the rotary thrust device, in particular via thread engagement between the thrust member and the drive shaft, specifically a thread on the drive shaft, transfers the rotational movement to the thrust member and the latter to the eccentric ring. While running along the drive shaft in the axial direction, the thrust member changes the eccentricity of the eccentric ring relative to the rotation axis of the drive shaft via the slide guidance and the inclined sliding surface. Here, eccentricity relates to the distance of the center, viewed in radial direction, of the outer circumferential surface of the eccentric ring relative to the rotation axis of the drive shaft. Finally, when the respective stop position is reached, the thrust member in its first stop position holds the eccentric ring in the first stroke adjustment position, and in its second stop position holds the eccentric ring in the second stroke adjustment position via its inclined sliding surface. In doing so, the thrust member rotates together with the drive shaft about its rotation axis. The inclined sliding surface is thus configured such that it does not only effect the stroke adjustment or the change of eccentricity of the eccentric ring relative to the drive shaft, but also maintains the respective stroke adjustment position of the eccentric ring relative to the drive shaft. As used herein, the receiving space refers to a region within which the thrust member is displaceable along the drive shaft in axial direction essentially within the eccentric ring.

It is preferred in the interaction when the eccentric device comprises a sliding wedge transmission which is configured in such a way that it translates displacement of the thrust member along the rotation axis of the drive shaft into displacement of the eccentric ring in the radial direction to the rotation axis of the drive shaft. The thrust member forms the wedge, the freedom of movement of which runs in the direction of the rotation axis of the drive shaft. If said wedge is displaced in its position on the drive shaft relative to the eccentric ring, this results in a forced displacement of the radial position of the eccentric ring relative to the drive shaft which finally effects the desired stroke adjustment. Due to the fact that the freedom of movement of the thrust member along the drive shaft is limited by axially-spaced stops, with the displacement range defined there-between, two defined end positions and finally two defined stroke adjustment positions of the tamping beam can be realized by rotation of the drive shaft in one or the other direction.

Preferably, the thrust member and the eccentric ring are essentially locked against rotation relative to each other in the direction of rotation of the drive shaft by means of a guide device, and at the same time are displaceable relative to one another along the drive shaft. Locked against rotation here relates to a situation where the thrust member is secured against rotation in particular within the receiving space of the eccentric ring relative to the latter. This does not mean that no clearance can be present here. Said clearance is even advantageous, for example, in order to allow the required longitudinal displaceability of the two elements relative to one another. What is important here is that the thrust member is not arranged to be free and revolving in the eccentric ring, and that it performs a defined displacement movement relative to the eccentric ring via the guide device. The rotational lock is further also important to allow reliable translation of the rotational movement of the drive shaft to the eccentric ring and thus to the connecting rod when the thrust member is located in the first or the second stop position.

The specific configuration of the guide device may vary. Basically, all axially displaceable shaft-hub connections such as spline shaft connections (DIN5461), polygonal shafts (DIN32711), serrated shaft profiles (DIN5481), etc., are suitable. However, it turned out to be advantageous if the guide device comprises a groove extending in the axial direction and an engaging element engaging the groove, the groove being arranged on the thrust member and the engaging element being arranged on the eccentric ring, or vice versa. The engaging element may be an adjustment spring, particularly fixed to the thrust member and, in particular, formed integrally with said member, the spring projecting from the outer jacket surface of the thrust member in the radial direction into the groove on the eccentric ring.

In order to achieve a particularly reliable and stable guidance of the thrust member, in particular between its two stop positions on the one hand and for transmission of the rotational movement of the drive shaft onto the eccentric ring on the other hand, the thrust member preferably is a threaded sleeve having an inner thread, the inner thread preferably engaging a threaded portion or a catching pin or another catching device of the drive shaft. The thrust member is preferably configured such that it circumferentially engages around the threaded portion on the drive shaft or is a sleeve with an inner thread, for example, or comprises a corresponding through opening with an inner thread, in which the threaded portion may rotate. In this way, the position of the thrust member relative to the drive shaft is ensured in a particularly reliable manner, and a jamming does not occur during displacement along the drive shaft.

It is generally possible to configure the inclined sliding surface as a protrusion element or the like. It is ideal, however, if the inclined sliding surface of the thrust member is formed by its outer jacket surface per se. In this embodiment, the thrust member thus abuts almost with its entire outer jacket surface against the inner jacket surface of the receiving space of the eccentric ring. This contributes to a particularly reliable guidance of the thrust member relative to the eccentric ring.

Specifically, the outer jacket surface of the thrust member may be configured cylindrically, in particular in the shape of an oblique cylinder. An oblique cylinder is characterized in that its two face sides run parallel to one another but are not perpendicular to the outer jacket surface of the cylinder or the cylinder axis, respectively. The thrust member is preferably arranged in the eccentric ring such that its cylinder axis intersects the rotation axis of the drive shaft at an acute angle, particularly at an angle of 3° to 15°, more particularly 5° to 10°, and very particularly 7° to 9°. The angle is determined in a plane in which both the cylinder axis of the thrust member as well as the rotation axis of the drive shaft extend. In the angular ranges mentioned above, optimum translation of the displacement movement of the thrust member along the drive shaft into a displacement movement of the eccentric ring in the radial direction of the drive shaft and a compact structure for the desired stroke adjustment range is achieved.

It is preferred for the receiving space of the eccentric ring to be configured as a cavity which is essentially complementary to the outer jacket surface of the thrust member. This also allows abutment between the thrust member and the eccentric ring, as much as possible across their entire surfaces. Accordingly, the eccentric ring comprises a hollow-cylindrical receiving space for the thrust member, particularly configured as a hollow oblique cylinder. The cylinder axis of said cylindrical cavity ideally runs coaxially to the cylinder axis of the thrust member.

It is important for the thrust member to be movable within the receiving space along the drive shaft between two defined stop positions. In order to achieve that, appropriate stops are preferably used. The receiving space is therefore ideally delimited on both sides in the axial direction of the drive shaft by stop walls. Said stop walls may be partially formed by the eccentric ring itself, although it is preferred if the stop walls are achieved by stop discs arranged separately from the eccentric ring. The stop discs may, however, be locked against rotation with the drive shaft and/or with the eccentric ring.

For transferring the eccentric rotational movement of the eccentric ring to the connecting rod, it is preferred for the eccentric ring, in the radial direction to its outer side, to be rotatably supported in a bearing of a connecting rod, in particular by means of a slide bearing or roller bearing. The eccentric ring is thus freely rotatable about the rotation axis of the drive shaft relative to the connecting rod.

Another aspect of the present invention is a paving screed for a road paver with a tamping beam device according to the present invention. With respect to maintenance, it is advantageous for all tamping beam devices provided on the respective screed to be configured according to the present invention. Generally, however, it is preferred if at least two tamping beam devices according to the present invention are provided per tamping beam. This allows ensuring a particularly uniform tamping movement, in particular across the longitudinal extension of the tamping beam. In the case of short tamping beams (having a total length of 250 mm, for example), one single tamping beam device may be sufficient.

The present invention also relates to a road paver with a paving screed according to the present invention. Road pavers in their basic function are known from the prior art. It is the essential object of a road paver to distribute, compact and smoothen supplied paving material on the ground. The drive of the tamping beam device according to the present invention ideally occurs via a drive source provided on the road paver itself, a combustion engine, for example. It is particularly preferable if a secondary drive such as a hydro motor or an electric motor is driven by the primary drive, in particular the combustion engine. The secondary drive then drives, directly or indirectly, the drive shaft of the tamping beam device.

Another aspect of the present invention is a method for changing the stroke of a tamping beam device, in particular of a tamping beam device according to the present invention. The method according to the present invention comprises the steps described below.

A) Operating the tamping beam device in a first stroke adjustment position with a drive shaft rotating in a first direction of rotation. The starting point is thus a first stroke adjustment position. In this state, the tamping beam thus tamps with or at a first stroke with respect to the vertical direction.

In order to change the stroke of the tamping beam device, in a further step B) the direction of rotation of the drive shaft is switched to a second direction of rotation opposite the first direction of rotation. Thus, if in step A) the drive shaft rotated clockwise, in step B) the drive shaft is switched so as to rotate in the counter-clockwise direction. Reversal of the direction of rotation may be effected by means of switching the drive motor, or it may be achieved through transmission-related measures, for example, a suitable switch transmission.

Switching the direction of rotation triggers displacement of a thrust member on the drive shaft along the rotation axis of the drive shaft in step C) by a rotary thrust drive, for example, a rotary thrust transmission. Specifically, this may, for example, be effected by the thrust member sliding along a threaded portion on the drive shaft. Thus, the thrust member moves in this step along the longitudinal axis of the drive shaft, the thrust movement being driven by the rotation of the drive shaft.

In step D), said axial movement of the thrust member drives the change in eccentricity of the eccentric ring by translating the movement of the thrust member along the drive shaft into a displacement movement of an eccentric ring in the radial direction to the direction of rotation of the drive shaft. This may be effected, for example, by a sliding wedge transmission or a similar device having an inclined sliding surface and a slide guidance. An essential factor thus lies with using the axial movement of the thrust member so as to effect radial displacement of the eccentric ring, to which end the thrust member and the eccentric ring are preferably coupled to one another via a transmission or as parts of a transmission. The extent of displacement depends, for example, on the slope of the respective transmission inclinations, and basically also on the movement distance of the thrust member along the drive shaft.

If the thrust member stops against an axial stop in step E), the eccentric ring has assumed its second final position. Continuation of the rotational movement of the drive shaft does then no longer result in a further continuation of the displacement of the thrust member along the drive shaft, but, according to step F), in a translation of the rotational movement of the drive shaft via the thrust member to the eccentric ring and thus finally to the connecting rod.

Thus, the method according to one embodiment of the present invention particularly allows the tamping beam to halt during step C) and to not move when changing from one stroke adjustment position to the other. This is of particular advantage if undesired tamping of the tamping beam onto the ground to be processed is to be prevented when changing the stroke adjustment position.

BRIEF DESCRIPTION OF THE DRAWINGS

The present invention is explained in more detail below by means of the exemplary embodiments illustrated in the figures. In the schematic figures.

Throughout the figures like components are indicated by the like reference numerals, although not each component repeatedly shown in the figures is necessarily designated in each figure.

DETAILED DESCRIPTION OF THE INVENTION

Figure 1:
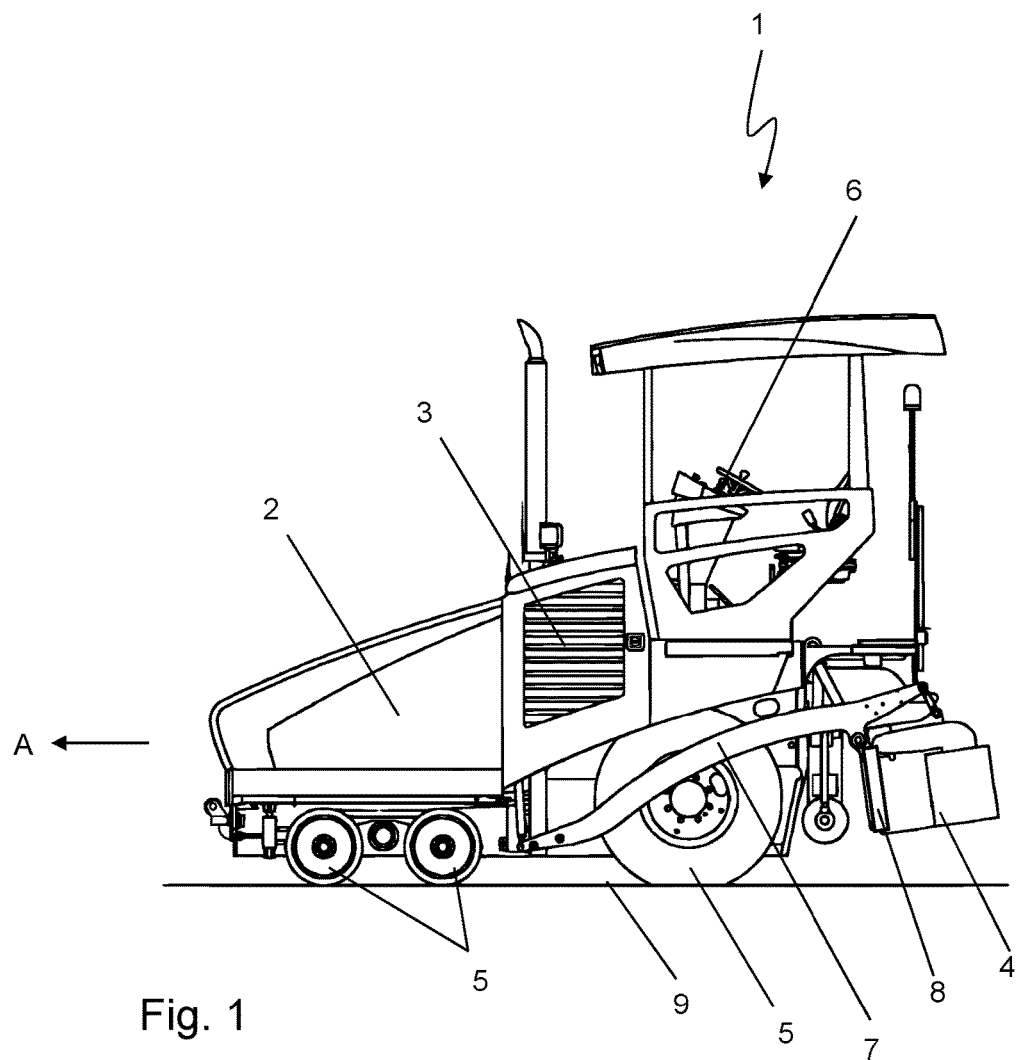
FIG. 1 is a side view of a road paver.

FIG. 1 illustrates the basic structure of a typical road paver 1. Components of the road paver 1 are a bunker 2, a drive motor 3, a paving screed 4, travelling devices 5 (wheel and/or crawler tracks) and an operator platform 6. During paving operation, the road paver 1 travels in the working direction A over the ground 9. The paving screed 4 is connected to the machine frame of the road paver 1, which is not explained in detail here, via towing arms 7. Besides the smoothening function, the paving screed 4 also has a compaction function. To that end, a tamping beam device 8 is additionally arranged on the paving screed 4. The other figures relate to the structure and functioning of said tamping beam device 8.

Figure 2A:
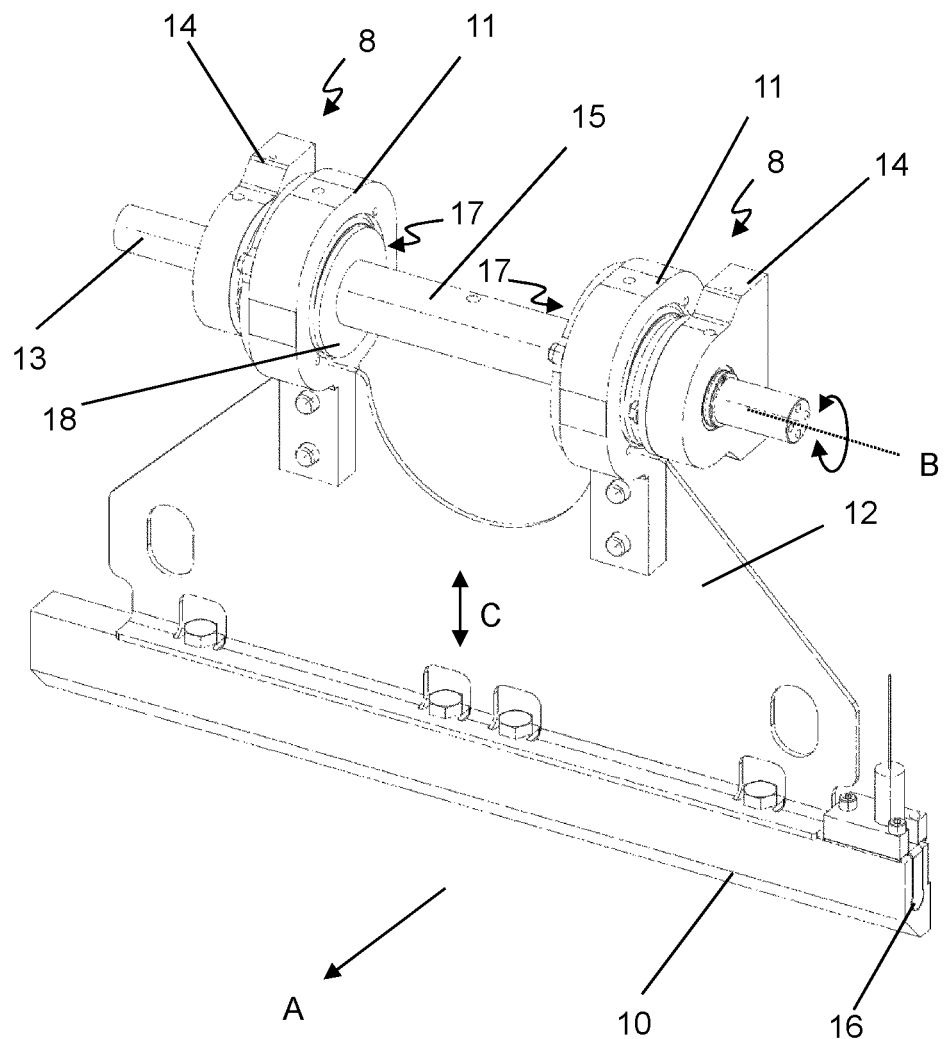
FIG. 2A is an oblique perspective view of a tamping beam device.

FIG. 2A shows the tamping beam device first in its entirety from an oblique perspective front view. During working operation, the tamping beam device 8 is guided in the working direction A over the ground material to be paved. Elements of the tamping beam device 8 are a tamping beam 10, a connecting rod 11, a connecting metal plate 12, a drive shaft 13, a holding arm 14, as well as an eccentric device 17. Usually, the tamping beam 10 is further equipped with a heating element so that it can be heated. This is indicated in FIG. 2A by the heating element 16. In the exemplary embodiment according to FIG. 2A, the tamping beam 10 is mounted on the paving screed via a total of two tamping beam devices 8 and via two holding arms 14. The two tamping beam devices 8 are similar in structure and function. Movement of the tamping beam 10 is a tamping/stroke movement in the direction of the double arrow C. Said movement is initiated by the drive shaft 13 rotating clockwise or counter-clockwise about the rotation/revolution axis of the drive shaft in a direction of rotation/revolution B. A drive device such as an electric or hydro motor or a suitable transmission, which is not described in more detail, is provided to that end.

Said centric rotational movement is translated into eccentric rotational movement by means of the eccentric device 17 and is transferred to the connecting rods 11. The eccentric crank motion is finally translated into the desired tamping movement of the tamping beam 10 via the connecting metal plate 12. The tamping beam 10 is accordingly designed so as to be guided on the screed 8 (not further explained in the figures). Corresponding guides are known from the prior art. Details on the configuration and functioning of the eccentric device 17 can be taken from the following figures. An essential characteristic here is that the eccentric device 17 is configured such that the stroke height, i.e., the extent of the tamping/stroke movement, can be adjusted between two stroke heights in the direction of double arrow C (or in the vertical direction, respectively) depending on the direction of rotation B of the drive shaft 13.

Figure 2B:
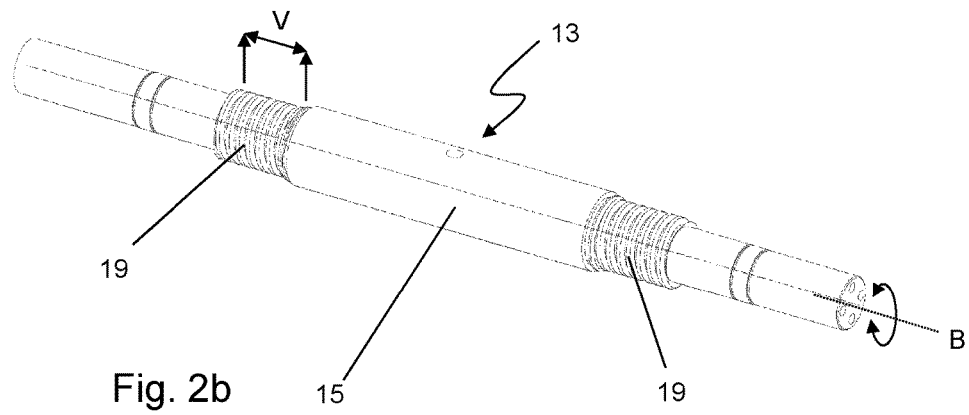
FIG. 2B is an oblique perspective view of a drive shaft of the tamping beam device of FIG. 2A.

FIG. 2B emphasizes the design of the drive shaft 13. Besides the face-sided bearing and/or drive parts, threaded portions 19 connected to one another via a middle region 15 are elements of the drive shaft 13. The two threaded portions 19 each comprise a helical thread extending within a displacement portion V along the longitudinal axis B of the drive shaft 13.

Figure 2C:
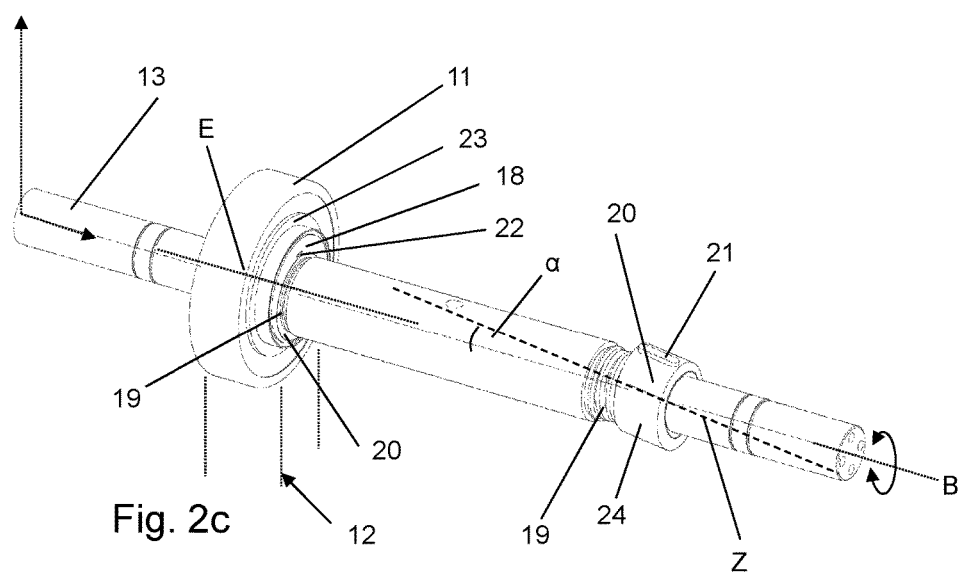
FIG. 2C shows the drive shaft of FIG. 2B with an eccentric device.

A thrust member 20 runs on the threaded portion 19 which in the present exemplary embodiment is a sleeve with an inner thread 32. In FIG. 2C, the thrust member 20 is screwed onto the threaded portion 19 on the right side. FIG. 2C illustrates that the width of the thrust member 20 in the axial direction of the rotation axis B is less than the longitudinal extension of the threaded portion 19. As can further be taken from FIG. 2C, the essentially cylindrical thrust member 20 is seated obliquely or inclined on the drive shaft and in particular on the threaded portion 19. This means that the inner through hole, which is formed complementary to the thread of the threaded portion 19 and comprises a corresponding inner thread of the thrust member 20, does not run along the cylinder axis Z of the cylindrical outer jacket surface of the thrust member 20, but coaxially to the rotation axis B. The outer jacket surface of the thrust member thus provides an inclined sliding surface which interacts with the eccentric ring 18 in a manner described below in more detail.

FIG. 2C further illustrates that in the present exemplary embodiment, the thrust member 20 comprises a protrusion 21 projecting in the radial direction from the outer jacket surface, said protrusion extending longitudinally in the direction of the cylinder axis Z and running parallel to said axis across almost the entire axial width of the thrust member 20. Said protrusion may particularly be an adjustment spring and ensures rotational locking of the thrust member 20 relative to the eccentric ring 18.

At the threaded portion 19 on the left side in FIG. 2C, in addition to the thrust member 20, the eccentric ring 18 and the roller bearing 23 (the housing thereof, respectively) of the connecting rod 11 are shown. FIG. 2C illustrates that the eccentric ring is also a sleeve-type component, which is configured to surround the thrust member 20 (relative to the rotation axis B). In the eccentric ring 18, a guide groove 22 is provided in which the protrusion 21 of the thrust member 20 runs. Therefore, the thrust member 20 and the eccentric ring 18 are locked against rotation relative to each other with respect to the rotation axis B of the drive shaft 13. At the same time, however, the thrust member can be displaced in the axial direction of rotation axis B and thus relative to the eccentric ring 20. To that end, the corresponding guide groove is configured longer with respect to its length in the axial direction B than the total extension of the protrusion 21. Due to the inclination of the outer jacket surface of the thrust member 20 relative to the rotation axis B of the drive shaft, the eccentricity of the outer jacket surface of the eccentric ring 18 is adjusted by such longitudinal movement of the thrust member 20. In other words, the position of the contact area between these two elements 18 and 20 changes along with the displacement of the thread member 20 relative to the eccentric ring 18, so that a different eccentricity is achieved. This will be further explained below based upon the following sectional views. The eccentric rotational movement of the eccentric ring 18 is transferred to the connecting rod 11 surrounding the eccentric ring on its outer jacket surface. The existing eccentricity is indicated in FIG. 2C by the orientation of the cylinder axis Z relative to the outer jacket surface of the eccentric ring 18 or the connecting rod bearing 11, which is also annular. Further linkage of the connecting metal plate 12 as well as of the tamping beam 10 are merely indicated in FIG. 2C.

Figure 3:
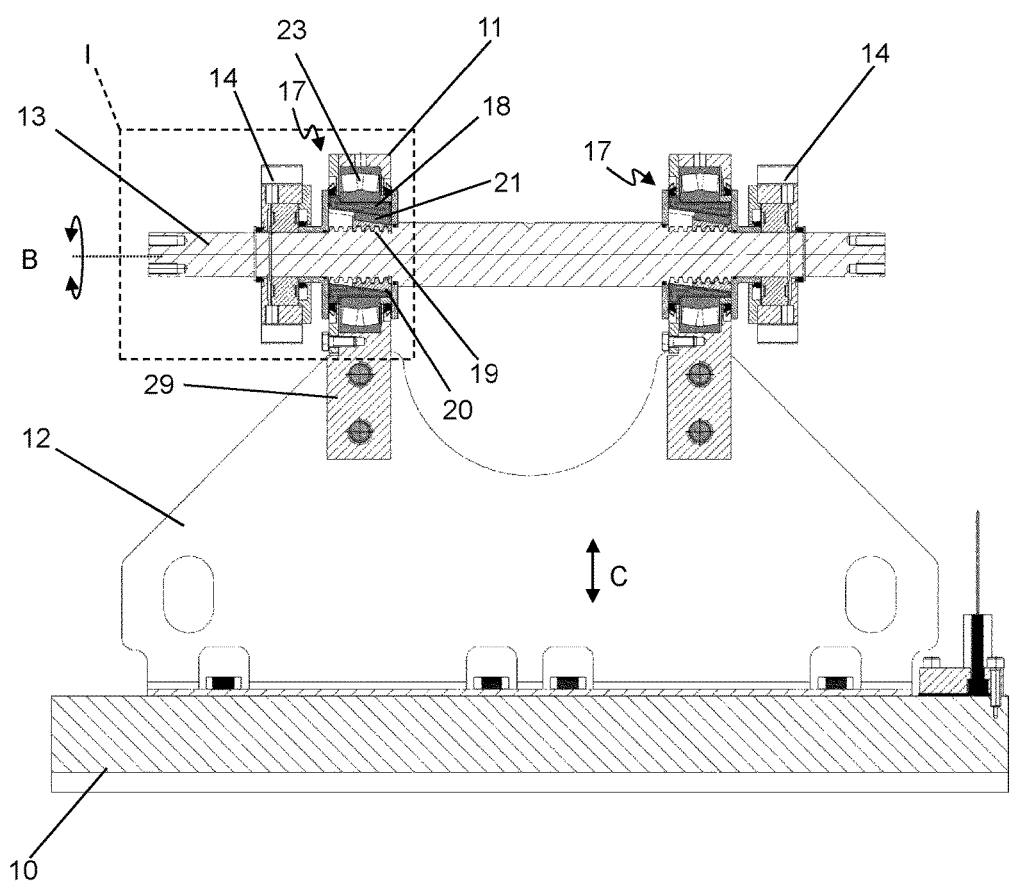
FIG. 3 is a sectional view through the tamping beam device of FIG. 2A.
Figure 4A:
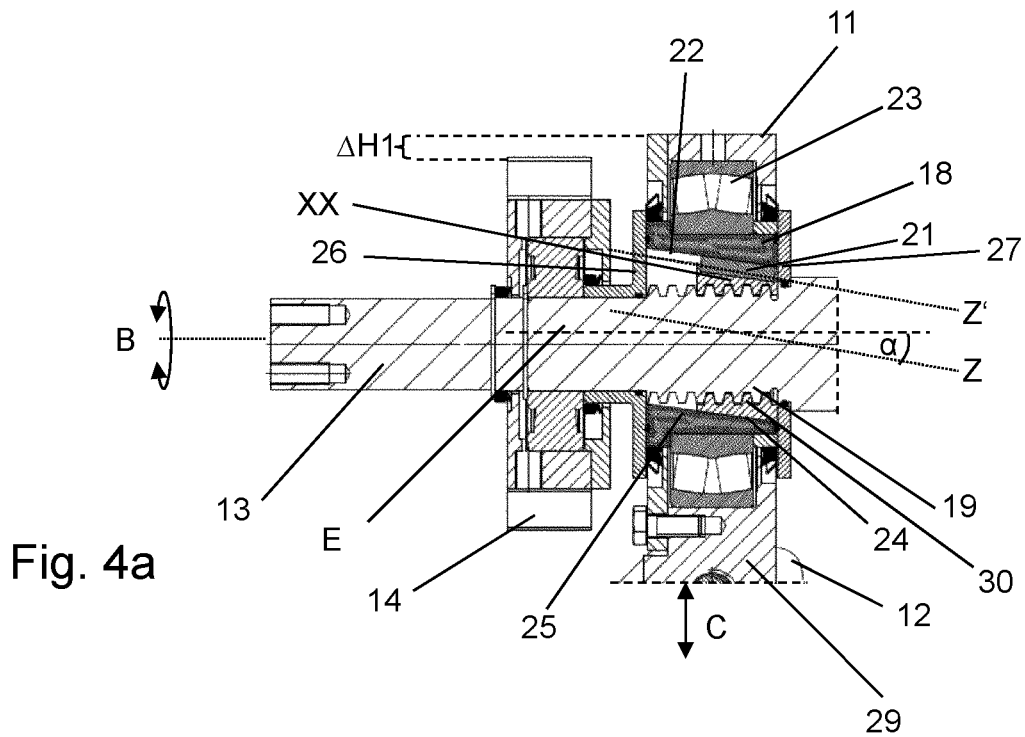
FIG. 4A is an enlarged detail view of region I of FIG. 3, with large stroke at the upper dead point.

FIG. 3 shows the exemplary embodiment according to FIG. 2A in a sectional view in a vertical plane along the rotation axis B of the drive shaft 13 and FIG. 4A shows the framed region I in an enlarged detail view. FIGS. 3 and 4a illustrate that by the above described design of the thrust member 20 and the eccentric ring 18 a sliding wedge transmission is obtained such that a longitudinal movement of the thrust member 20 results in a radial displacement of the eccentric ring 18 relative to the drive shaft 13. By the inclined arrangement of the cylinder surface of the thrust member 20, an inclined sliding surface 24 on the thrust member 20 is achieved. The eccentric ring abuts said inclined sliding surface 24 with a correspondingly formed slide guidance, corresponding to its inner jacket surface. If the relative position of the thrust member 20 is displaced along the rotation axis B of the drive shaft 13 relative to the eccentric ring 18, the eccentric ring 18 slides along the inclined sliding surface 24 of the thrust member 20 and is thus lifted or lowered relative to the rotation axis B. Said displacement movement is driven by the thread engagement of the thrust member 20 into the respective threaded portion 19 of the drive shaft 13. Thus, the thrust member 20 constitutes a catch for the eccentric ring 18. If the drive shaft 13 rotates, the thrust member is screwed along the respective climb direction of the threaded portion along the drive shaft 13 by this movement. Said screwing movement is continued until the thrust member 20 is stopped in its longitudinal movement on the drive shaft 13. In the present exemplary embodiment, this is effected by stops 26 and 27, which delimit the movement space or receiving space within the eccentric ring 18 for the thrust member 20 in the axial direction of the rotation axis B in both directions.

All in all, the specific configuration achieves a rotary thrust device 30, in particular comprising the thrust member 20 and its functional connection to the drive shaft 13 in such a way that the thrust member 20 is displaceable within a limited range along the longitudinal axis of the drive shaft 13. Regarding its effect, the rotary thrust device 30 is configured in the manner of a spindle drive.

Figure 4B:
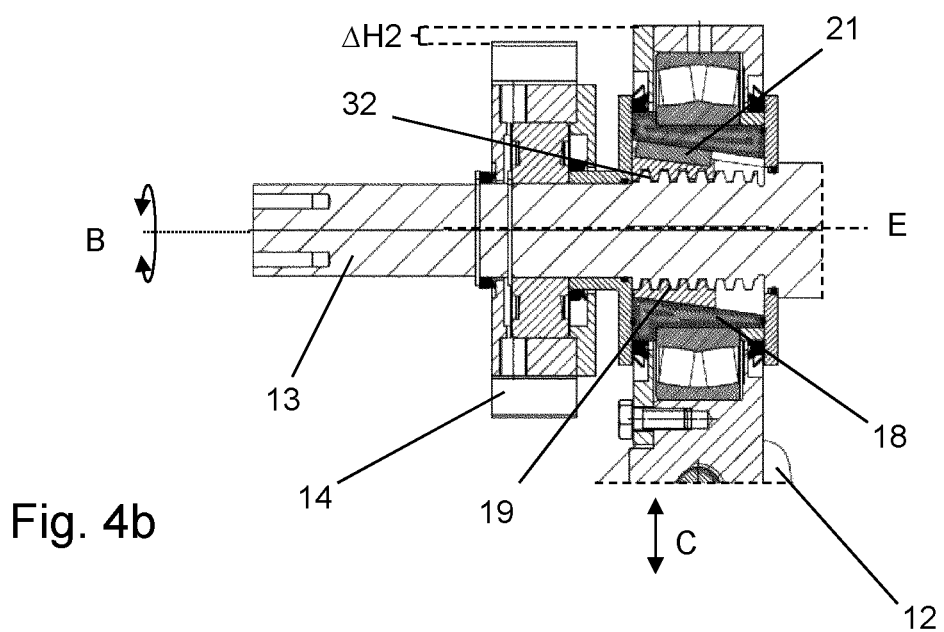
FIG. 4B is an enlarged detail view according to FIG. 4A with small stroke at the upper dead point.

Now, FIGS. 4A and 4B relate to the two stroke adjustments possible in the present exemplary embodiment. FIGS. 4A and 4B each show a sectional view through the eccentric device 17, in each case at the moment in which the connecting rod 11 or the eccentric device 17, respectively, have reached their respective upper dead point. If the thrust member 20 is displaced to the right on the drive shaft in the present exemplary embodiment and stops there at stop 27, the distance to the horizontal plane, for example, to the upper edge of holder 14, is ΔH1 (this large stroke corresponds to the double vertical distance between E and B in FIG. 4A). Continuation of the rotational movement of the drive shaft 13 results in the thrust member 20 being not further displaceable along the axial direction. Instead, a form fit is created between the drive shaft, the thrust member 20 and the eccentric ring 18, so that said ring performs its eccentric rotational movement and via said movement causes the connecting rod 11 and finally the tamping beam, which is not shown in FIG. 4A, to perform the tamping movement. For the purpose of better illustration, FIG. 4A also indicates the position of the axis of the eccentric ring, i.e., of the axis which forms the center axis of the outer circumferential surface of the eccentric ring. It can be clearly taken from the figure that said axis runs parallel but not coaxially to the rotation axis B of the drive shaft 13.

If the rotational direction of the drive shaft 13 is reversed, the rotational movement of the eccentric ring 18 about the drive shaft B is initially interrupted. This is due to the fact that with the first rotations of the drive shaft 13 effected in the reverse rotational direction the thrust member 20 runs down the threaded portion 19 until stopping at the stop 26. At this moment, no transmission of movement is effected to the eccentric ring 18 in the direction of rotation B of the drive shaft 13, and the movement sequence enabled by the rotary thrust device 30 is effected in which the rotational movement of the drive shaft is translated into a thrust movement of the thrust member. Here, the eccentric ring slides via its slide guidance along the inclined sliding surface of the thrust member 20 and approaches the rotation axis B of the drive shaft 13 with its central axis Z. This process lasts until the movement of the thrust member 20 along the drive shaft 13 is stopped by the stop 26. If the rotation of the drive shaft 13 is then continued, a form fit with corresponding locking (in this direction only) is effected between the drive shaft 13, the thrust member 20 and the eccentric ring 18 such it rotates about drive shaft 13, however with the reduced stroke ΔH2 (corresponding to the double vertical distance between E and B in FIG. 4B).

The total stroke of the respective stroke adjustment positions in FIGS. 4A and 4B thus corresponds to the double distance of the eccentric axis E relative to the rotation axis B in the radial direction to said axes.

Figure 5:
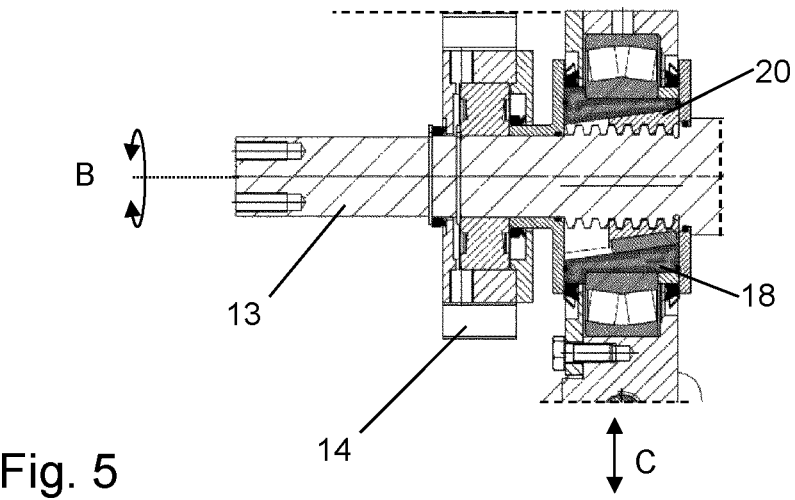
FIG. 5 is an enlarged detail view according to FIG. 4A at the bottom dead point.

Finally, in contrast to FIG. 4, FIG. 5 shows the bottom dead point in a sectional view, here also in an enlarged view of box 1 of FIG. 3. It becomes obvious here that the thrust member 20, as long as in the respective stop position, rotates together with the drive shaft 13 in the direction of rotation B, as does the eccentric ring 18. The eccentric position of the eccentric ring relative to the drive shaft is thus safely kept in position and the tamping beam performs a defined stroke.

Figure 6:
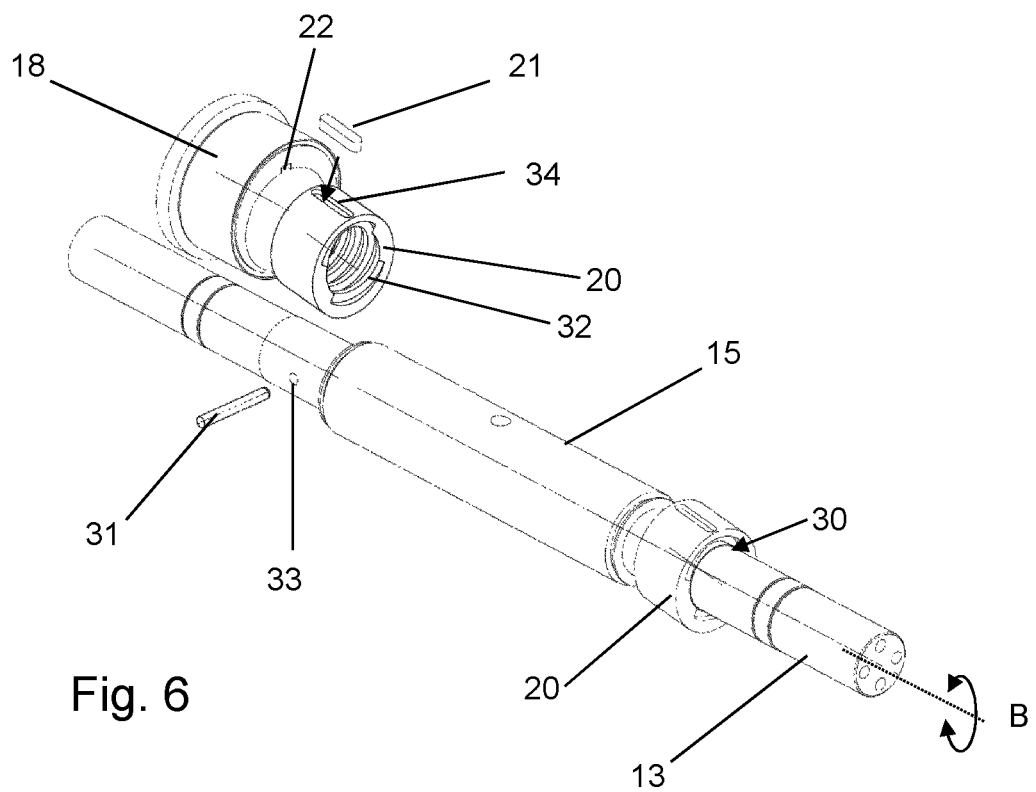
FIG. 6 shows the drive shaft with the eccentric device according to a second embodiment of a tamping beam device.
Figure 7:
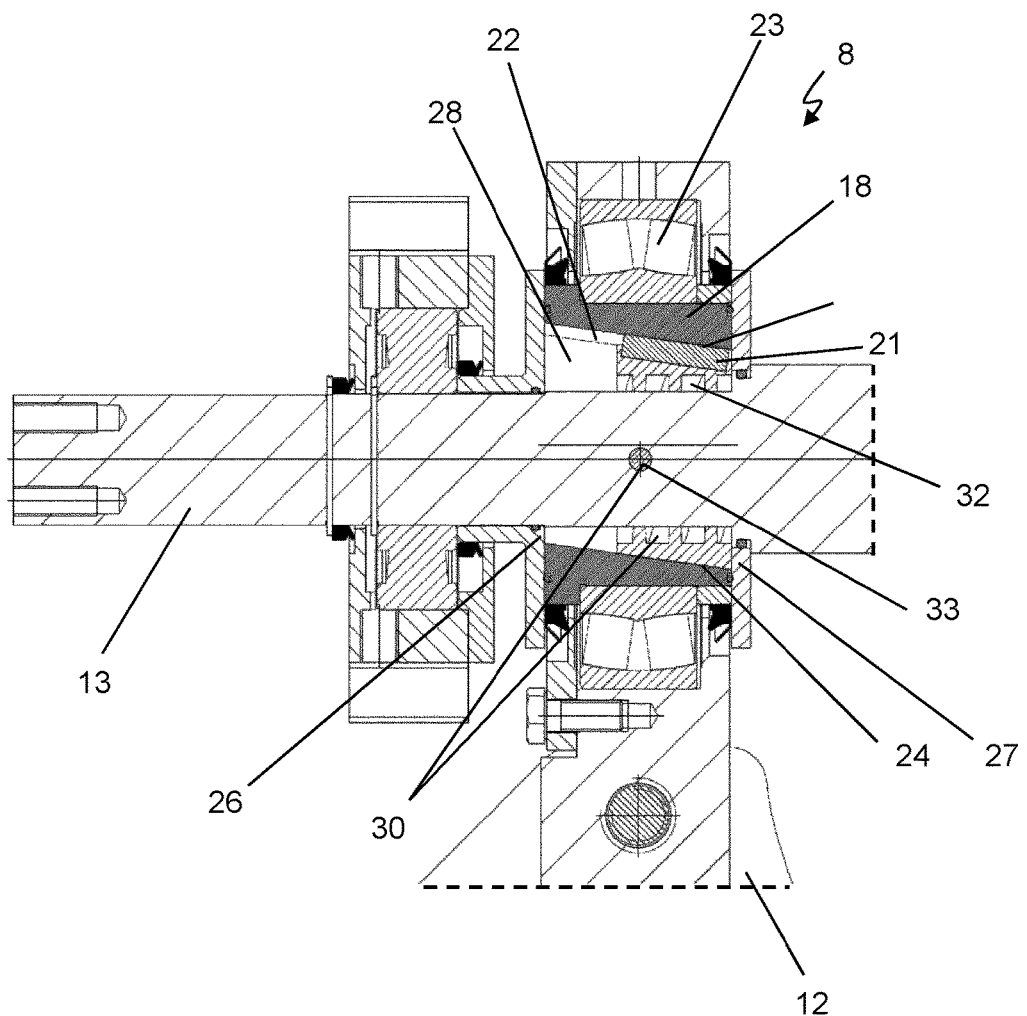
FIG. 7 is an enlarged detail view of a sectional view through the eccentric device of the tamping beam device of FIG. 6.

FIGS. 6 and 7 show an alternative configuration of the tamping beam device 8. Below, reference is made to the existing differences only, while otherwise reference is made to the above statements with respect to the first exemplary embodiment.

The essential difference of the tamping beam device 8 according to FIGS. 6 and 7 lies with the configuration of the drive shaft or coupling of the drive shaft to the thrust member 20, respectively. Instead of the threaded portion 19 on the drive shaft 13 as used in the first exemplary embodiment, a catching pin 31 is provided here. Said pin protrudes to both sides of the drive shaft 13 in the radial direction and engages the inner thread 32 of the thrust member 20. In the specific exemplary embodiment, a pin receptacle 33 in the form of a through bore is provided in the drive shaft 13 to that end. Another possible modification consists in arranging the thread of the rotary thrust device 30 on the drive shaft 13 and the catching pin 31 on the thrust member 20, which would, in terms of the design of the rotary thrust device 30, then correspond to an arrangement which is reversed with regard to that of FIGS. 6 and 7.

FIG. 6 illustrates the arrangement of the protrusion 21 or the adjustment spring, respectively, in a corresponding receiving depression 34 in the outer jacket surface of the thrust member 20.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A tamping beam device of a paving screed with a tamping beam arranged on at least one connecting rod, with a drive shaft connected to the connecting rod via an eccentric device, the eccentric device being configured such that a first and a second stroke adjustment position of the tamping beam is adjusted depending on a direction of rotation of the drive shaft,
wherein the eccentric device comprises:
a thrust member which is displaced on the drive shaft in the axial direction by rotation of the drive shaft via a rotary thrust device having a contact geometry comprising a shape of a helical line, the thrust member comprising an inclined sliding surface on its outer circumferential surface which runs inclined relative to a rotation axis (B) of the drive shaft;
an eccentric ring mounted on the connecting rod which comprises a receiving space for the thrust member with a slide guidance running on the inclined sliding surface,
the receiving space being configured such that the thrust member is displaced between a first and a second stop position along the drive shaft in the axial direction of the drive shaft by rotation of the drive shaft in one or the other direction of rotation, thereby, via the inclined sliding surface, holding the eccentric ring in the first stroke adjustment position when in the first stop position, and holding the eccentric ring in the second stroke adjustment position when in the second stop position.

2. The tamping beam device according to claim 1, wherein the rotary thrust device comprises at least one of the following features:
a rotary thrust gear;
a thread extending coaxially to the rotation axis of the drive shaft;
a catcher engaging a thread.

3. The tamping beam device according to claim 1, wherein the eccentric device comprises a sliding wedge transmission configured such that the eccentric device translates a displacement of the thrust member along the rotation axis of the drive shaft into a displacement of the eccentric ring in the radial direction.

4. The tamping beam device according to claim 1,
wherein the thrust member and the eccentric ring are essentially locked against rotation relative to one another in the direction of rotation of the drive shaft via a guide device, and at the same time displaceable relative to one another along the drive shaft.

5. The tamping beam device according to claim 4,
wherein the guide device comprises a groove extending in the axial direction and an engaging element engaging the groove, the groove being arranged on the thrust member and the engaging element being arranged on the eccentric ring or vice versa.

6. The tamping beam device according to claim 5,
wherein the engaging element is a protrusion fixed to the thrust member said protrusion projecting from the outer jacket surface of the thrust member in the radial direction into the groove in the eccentric ring.

7. The tamping beam device according to claim 1,
wherein the thrust member is a threaded sleeve with an inner thread engaging a threaded portion of the drive shaft.

8. The tamping beam device according to claim 1,
wherein the inclined sliding surface of the thrust member is formed by the outer surface of the thrust member.

9. The tamping beam device according to claim 1,
wherein the outer surface of the thrust member is configured to be cylindrical, in particular in the shape of an oblique cylinder, the axis of the cylinder (Z) extending in particular such that it intersects the rotation axis (B) of the drive shaft at an angle of 3° to 15°.

10. The tamping beam device according to claim 1,
wherein the receiving space of the eccentric ring is formed as a cavity which is essentially complementary to the outer surface of the thrust member the cylinder axis extending coaxially to the cylinder axis (Z) of the thrust member.

11. The tamping beam device according to claim 1,
wherein the receiving space is delimited in the axial direction of the drive shaft on both sides by stop walls provided separately from the eccentric ring.

12. The tamping beam device according to claim 1,
wherein the eccentric ring, to its outer side in the radial direction, is rotatably supported in a connecting rod bearing.

13. A paving screed for a road paver with a tamping beam device according to claim 1.

14. A paving screed according to claim 13,
wherein the paving screed comprises a tamping beam which is supported and driven by at least two of the tamping beam devices according to claim 1.

15. A road paver having a paving screed according to claim 1.

16. A method for changing the stroke of a tamping beam device, in particular according to claim 1, comprising the steps of:
  a) operating the tamping beam device in a first stroke adjustment position with the drive shaft rotating in a first direction of rotation;
  b) switching the direction of rotation of the drive shaft to a second direction of rotation opposite the first direction of rotation;
  c) displacing the thrust member on the drive shaft along the rotation axis of the drive shaft via the rotary thrust device;
  d) translating the movement of the thrust member along the drive shaft into a displacement movement of the eccentric ring in the radial direction to the direction of rotation of the drive shaft;
  e) stopping of the thrust member at an axial stop; and
  f) transferring the rotational movement of the drive shaft to the eccentric ring via the thrust member.

17. The method according to claim 16,
wherein the tamping beam stands still during step c).

18. The tamping beam device according to claim 2,
wherein the catcher comprises a catching pin.

19. The tamping beam device according to claim 1,
wherein the outer surface of the thrust member is configured to be cylindrical, in particular in the shape of an oblique cylinder, the axis of the cylinder (Z) extending in particular such that it intersects the rotation axis (B) of the drive shaft at an angle of 5° to 10°.

20. The tamping beam device according to claim 1,
wherein the outer surface of the thrust member is configured to be cylindrical, in particular in the shape of an oblique cylinder, the axis of the cylinder (Z) extending in particular such that it intersects the rotation axis (B) of the drive shaft at an angle of 7° to 9°.

* * * * *